United States Patent
Onishi

(10) Patent No.: US 9,008,949 B2
(45) Date of Patent: Apr. 14, 2015

(54) SOOT DISCHARGE ESTIMATING DEVICE FOR INTERNAL COMBUSTION ENGINES

(75) Inventor: Tomomi Onishi, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 542 days.

(21) Appl. No.: 13/376,052

(22) PCT Filed: Jun. 3, 2009

(86) PCT No.: PCT/JP2009/060571
§ 371 (c)(1),
(2), (4) Date: Feb. 14, 2012

(87) PCT Pub. No.: WO2010/140263
PCT Pub. Date: Dec. 9, 2010

(65) Prior Publication Data
US 2012/0143472 A1    Jun. 7, 2012

(51) Int. Cl.
*F02D 41/24*    (2006.01)
*F02D 41/02*    (2006.01)
*F01N 3/021*    (2006.01)
(Continued)

(52) U.S. Cl.
CPC .............. *F02D 41/029* (2013.01); *F01N 3/021* (2013.01); *F01N 11/00* (2013.01); *F02D 41/1467* (2013.01); *F01N 2900/1606* (2013.01); *F01N 2900/1611* (2013.01); *Y02T 10/20* (2013.01); *Y02T 10/47* (2013.01)

(58) Field of Classification Search
CPC ........................... F02D 41/029; F02D 41/1467
USPC ......................... 123/436, 672, 679, 703, 704; 701/103–105, 109, 110
See application file for complete search history.

(56) References Cited

U.S. PATENT DOCUMENTS

| 7,930,922 B2 | 4/2011 | Onishi et al. |
| 8,457,905 B2* | 6/2013 | Onishi et al. ................... 702/24 |
| 2003/0149536 A1 | 8/2003 | Silvis et al. |

(Continued)

FOREIGN PATENT DOCUMENTS

| DE | 102006000036 A1 | 8/2006 |
| FR | 2882093 A1 | 2/2006 |

(Continued)

OTHER PUBLICATIONS

International Search Report mailed Sep. 15, 2009 of PCT/JP2009/060571.

*Primary Examiner* — Hai Huynh
(74) *Attorney, Agent, or Firm* — Kenyon & Kenyon LLP

(57) ABSTRACT

A soot discharge amount is calculated by multiplying a "steady discharge amount" by a "transient correction value." The steady discharge amount is a Soot discharge amount in a steady operation state, and is acquired through table search. For each of a plurality of factors which affect the Soot discharge amount, a steady value (value obtained through table search) of the factor and a transient value (current value) of the factor are substituted for a characteristic equation which represents a change in the Soot discharge amount with the value of the factor, whereby a steady characteristic value and a transient characteristic value are acquired. The "ratio between the steady characteristic value and the transient characteristic value" is then calculated for each factor. The transient correction value is obtained by multiplying together all values of the "ratio between the steady characteristic value and the transient characteristic value" obtained for the factors.

7 Claims, 14 Drawing Sheets

(51) Int. Cl.
*F01N 11/00* (2006.01)
*F02D 41/14* (2006.01)

(56) References Cited

U.S. PATENT DOCUMENTS

| | | |
|---|---|---|
| 2006/0179826 A1 | 8/2006 | Kuboshima et al. |
| 2008/0022972 A1 | 1/2008 | Shimo et al. |
| 2013/0104529 A1* | 5/2013 | Takayanagi et al. ............ 60/297 |

FOREIGN PATENT DOCUMENTS

| | | |
|---|---|---|
| JP | 11-148412 A | 6/1999 |
| JP | 11-159385 A | 6/1999 |
| JP | 2001-207830 A | 8/2001 |
| JP | 2003-286879 A | 10/2003 |
| JP | 2003-307110 A | 10/2003 |
| JP | 2004-132328 A | 4/2004 |
| JP | 2004-183581 A | 7/2004 |
| JP | 2004-204821 A | 7/2004 |
| JP | 2004-360572 A | 12/2004 |
| JP | 2005-048743 A | 2/2005 |
| JP | 2006-016994 A | 1/2006 |
| JP | 2006-46299 A | 2/2006 |
| JP | 2006-226119 A | 8/2006 |
| JP | 2006-316682 A | 11/2006 |
| JP | 2007-23959 A | 2/2007 |
| JP | 2007-046477 A | 2/2007 |
| JP | 2008-031874 A | 2/2008 |
| JP | 2008-57486 A | 3/2008 |
| JP | 2009-062863 A | 3/2009 |

\* cited by examiner

| | | |
|---|---|---|
| FUEL MIST | | |
| IGNITION DELAY | SMALL | LONG |
| AVERAGE EQUIVALENCE RATIO IN MIST $\phi$ | LARGE | SMALL |
| SOOT DISCHARGE AMOUNT | LARGE | SMALL |

SOOT DISCHARGE ESTIMATING DEVICE FOR INTERNAL COMBUSTION ENGINES

This is a 371 national phase application of PCT/JP2009/060571 filed 03 Jun. 2009, the contents of which are incorporated herein by reference.

TECHNICAL FIELD

The present invention relates to a soot discharge estimating device for estimating the discharge amount of soot (fine particles of carbon, hereinafter also referred to as "Soot") generated in a combustion chamber of an internal combustion engine as a result of reaction of fuel.

BACKGROUND ART

Soot is the main component of particulate matter (PM) generated in a combustion chamber of an internal combustion engine (particularly, a diesel engine). In order to accurately control the discharge amount of such Soot to thereby reduce the same, the discharge amount of Soot must be accurately estimated.

For example, a soot discharge estimating device for an internal combustion engine disclosed in Japanese Patent Application Laid-Open (kokai) No. 2007-46477 employs a method for accurately estimating the discharge amount of Soot, even when the internal combustion engine is in a transient operation state, through use of a complex reaction model based on the mechanism of generation of Soot.

DISCLOSURE OF THE INVENTION

In the apparatus described in the publication, since a complex reaction model is used for estimation of the discharge amount of Soot, calculation load associated with estimation of the Soot discharge amount is considerably large. Therefore, there has been desire for a method of accurately estimating the discharge amount of Soot, even when the internal combustion engine is in a transient operation state, while reducing the calculation load.

The discharge amount of Soot depends upon an equivalence ratio. As the equivalence ratio is large, the discharge amount of Soot increases, in general. The equivalence ratio means a value obtained by multiplying a ratio of a fuel amount to air quantity by a stoichiometric air fuel ratio. The discharge amount of Soot more highly depends upon the equivalence ratio (hereinafter referred to as "mist equivalence ratio") in a fuel mist (air-fuel mixture) at a timing of starting ignition than upon an average equivalence ratio (hereinafter referred to as "average equivalence ratio in all cylinders" in the whole combustion engine. The mist equivalence ratio at the timing of starting ignition is significantly large, compared to the average equivalence ratio in all cylinders. Therefore, upon estimating the discharge amount of Soot, it is conceived that the mist equivalence ratio at the timing of starting ignition is preferably considered.

The present invention has been accomplished so as to solve the above-described problem, and its object is to provide a soot discharge estimating device for an internal combustion engine which can accurately estimate the discharge amount of Soot, with a small calculation load, even when the internal combustion engine is in a transient operation state, and in consideration of the mist equivalence ratio at the timing of starting ignition.

A soot discharge estimating device according to the present invention includes steady discharge amount acquisition means, steady value acquisition means, transient value acquisition means, transient correction value calculation means, and soot discharge amount estimation means. In the following, these means will be described successively.

The steady discharge amount acquisition means acquires a steady discharge amount of soot. The "steady discharge amount" is a discharge amount of soot in the case where the internal combustion engine is operated in a steady operation state at the current operation speed and with the current fuel injection amount. The steady discharge amount acquisition means acquires the steady discharge amount of soot on the basis of a previously stored relation (table, map) between discharge amount of soot discharged from the internal combustion engine and at least operation speed and fuel injection amount of the internal combustion engine in the case where the internal combustion engine is in a steady operation state, and respective current values of the operation speed and the fuel injection amount. This "relation" can be acquired in advance through an experiment or the like.

The steady value acquisition means acquires a steady value of a mist equivalence ratio at the timing of starting ignition. The "steady value of the mist equivalence ration at the timing of starting ignition" means a mist equivalence ratio at the timing of starting ignition in the case where the internal combustion engine is operated in a steady operation state at the current parameter values (e.g., the current operation speed, and current fuel injection amount). The "steady value of the mist equivalence ratio at the timing of starting ignition" is acquired on the basis of a previously stored relation (table, map) between the value of a predetermined parameter that represents an operation state of the internal combustion engine and the "mist equivalence ratio at the timing of starting ignition", and a current value of the predetermined parameter. The "predetermined parameter" is, for example, the operation speed, fuel injection amount, etc. of the internal combustion engine. This "relation" can also be acquired in advance through an experiment or the like.

The mist equivalence ratio is a value on the basis of the "ratio of the fuel amount to the air quantity" in the fuel mist. For example, it is a value acquired by multiplying the "ratio of the fuel amount to the air quantity" by the stoichiometric air fuel ratio. The mist equivalence ratio may be a local value in the fuel mist, or may be an average value in the fuel mist. The "mist equivalence ratio at the timing of starting ignition" is acquired on the basis of an ignition delay period (the period from the start of the fuel injection to the timing of starting ignition of the injected fuel). This is based upon a concept that the timing of starting ignition and the diffusion degree of the fuel mist are determined on the basis of the ignition delay period. Specifically, as the ignition delay period is shorter, the "mist equivalence ration at the timing of starting ignition" increases.

The transient value acquisition means acquires a transient value of the mist equivalence ratio at the timing of starting ignition, which is a current value of the mist equivalence ratio at the timing of starting ignition. This "transient value of the mist equivalence ratio at the timing of starting ignition" is acquired on the basis of at least the current value of the ignition delay period. The current value of the ignition delay period is, for example, a value detected or estimated by means for detecting or estimating the current ignition delay period.

The transient correction value calculation means calculates a transient correction value regarding the discharge amount of soot from a steady characteristic value and a transient characteristic value. The steady characteristic value is obtained on the basis of a previously stored characteristic involved with the discharge amount of soot to the mist equivalence ratio, and a steady value of the mist equivalence ratio at the timing of starting ignition. The transient characteristic value is obtained on the basis of the characteristic and a transient value of the mist equivalence ratio at the timing of starting ignition.

The "transient correction value" is, for example, the difference, ratio, etc. between the steady characteristic value and the transient characteristic value. In a transient operation state, the transient value of the mist equivalence ratio at the timing of starting ignition may deviate from the steady value thereof. The transient correction value serves as a value which represents the degree of deviation of the soot discharge amount from the steady discharge amount attributable to the "deviation of the transient value of the mist equivalence ratio at the timing of starting ignition from the steady value thereof," which may arise in the transient operation state.

The soot discharge amount estimation means estimates the discharge amount of soot on the basis of the steady discharge amount and the transient correction value. The discharge amount of soot can be obtained, for example, by means of multiplying the steady discharge amount by the transient correction value, or adding the transient correction value to the steady discharge amount. In the steady operation state, the transient correction value is calculated to become "1" (in the case where the steady discharge amount is multiplied by the transient correction value), or calculated to become "0" (in the case where the transient correction value is added to the steady discharge amount). Therefore, the discharge amount of soot coincides with the steady discharge amount.

According to the above-described configuration, the discharge amount of soot can be estimated accurately even in a transient operation state through processing that requires a small calculation load; i.e., table search for acquiring the steady discharge amount and calculation of the transient correction value. Additionally, the discharge amount of soot is estimated in consideration of the "mist equivalence ratio at the timing of starting ignition", which greatly affects the discharge amount of soot, whereby the discharge amount of soot can be estimated very accurately.

The generation speed (discharge speed) of soot is represented by the difference between the soot generation speed (the speed at which soot is generated as a result of reaction of fuel) and the soot oxidation speed (the speed at which the soot generated as a result of the reaction of fuel is oxidized). Accordingly, the discharge amount of soot can be estimated in consideration of (one or plural) factors that affect the soot generation speed and/or (one or plural) factors that affect the soot oxidation speed. The above-mentioned "mist equivalence ratio at the timing of starting ignition" is one of the factors that affect the soot generation speed. As the "mist equivalence ratio at the timing of starting ignition" is larger, the soot generation speed (accordingly, the discharge speed) increases, resulting in that the discharge amount of soot increases. In other words, as the ignition delay period is shorter, the "mist equivalence ratio at the timing of starting ignition" increases, which increases the discharge amount of soot. The transient value of the "mist equivalence ratio at the timing of starting ignition" is affected not only by the current value of the ignition delay period but also by a current value of an oxygen concentration of gas in the combustion chamber (in-cylinder oxygen concentration). Specifically, as the oxygen concentration is lower, the discharge amount of soot increases. Therefore, it is preferable that the transient value of the "mist equivalence ratio at the timing of starting ignition" is obtained on the basis of not only the current value of the ignition delay period but also the current value of the in-cylinder oxygen concentration. This can indicate that, as the in-cylinder oxygen concentration is smaller, the discharge amount of soot increases, in the case where the ignition delay period is constant.

In this case, an amount of mist forming gas at the timing of starting ignition can be acquired on the basis of the current value of the ignition delay period. The mist forming gas means a gas that forms the fuel mist in mixture of the fuel injected in the combustion chamber, and it is some gases in the combustion chamber. The transient value of the mist equivalence ratio at the timing of starting ignition can be acquired on the basis of the calculated amount of the mist forming gas at the timing of starting ignition, the current value of the oxygen concentration of the gas in the combustion chamber, and the injected fuel amount.

In the following, additional explanation is provided for the case where the above-mentioned "mist equivalence ratio at the timing of starting ignition" is used as the factor that affects the soot generation speed. In this case, preferably, only when a predetermined condition is satisfied, the transient correction value is calculated in consideration of the "mist equivalence ratio at the timing of starting ignition"; and, when the predetermined condition is not satisfied, the transient correction value is calculated without consideration of the "mist equivalence ratio at the timing of starting ignition". With this configuration, the transient correction value is calculated without consideration of the "mist equivalence ratio at the timing of starting ignition" under the condition that that the degree of influence of the magnitude of the "mist equivalence ratio at the timing of starting ignition" on the degree of generation of soot is small (that is, when the predetermined condition is not satisfied). Thus, when the transient correction value is calculated under such a condition, without lowering calculation accuracy, an increase in calculation load, which would otherwise occur as a result of taking the "mist equivalence ratio at the timing of starting ignition" into consideration, can be avoided.

Specifically, the predetermined condition is satisfied when the "transient value of the mist equivalence ratio at the timing of starting ignition" is greater than a predetermined value. This is because, when the "transient value of the mist equivalence ratio at the timing of starting ignition" is small, soot is less likely to be produced, and the degree of influence of the magnitude of the "mist equivalence ratio at the timing of starting ignition" on the degree of generation of soot is small.

Furthermore, the predetermined condition is satisfied when the flame temperature within the combustion chamber in an expansion stroke falls within a predetermined range. This is because, when the flame temperature falls outside the predetermined range, generation of soot is less likely to occur, and the degree of influence of the magnitude of the "mist equivalence ratio at the timing of starting ignition" on the degree of generation of soot is small. Notably, the flame temperature refers to the maximum value of the flame temperature (maximum flame temperature) or the like.

Furthermore, in the case where, as described above, the transient correction value is calculated in consideration of the "mist equivalence ratio at the timing of starting ignition" only when the predetermined condition is satisfied, the transient correction value may be calculated in consideration of the "mist equivalence ratio at the timing of starting ignition" only when the transient value of the "mist equivalence ratio at the timing of starting ignition" is larger than the steady value thereof, i.e., when the transient value has deviated from the steady value thereof in such a direction that the discharge amount of soot increases. In this case, the transient correction value is calculated without consideration of the "mist equivalence ratio at the timing of starting ignition" when the transient value of the mist equivalence ratio at the timing of starting ignition is not more than the steady value thereof", i.e., "when the transient value has deviated from the steady value thereof in such a direction that the discharge amount of soot decreases," which hardly raises a problem associated with the discharge amount of soot. With this operation, in such a case, when the transient correction value is calculated, it is possible to avoid an increase in calculation load, which would otherwise occur as a result of taking the "mist equivalence ratio at the timing of starting ignition" into consideration.

BEST MODE FOR CARRYING OUT THE INVENTION

An embodiment of a soot discharge estimating device for an internal combustion engine (diesel engine) according to the present invention will now be described with reference to the drawings.

Figure 1:
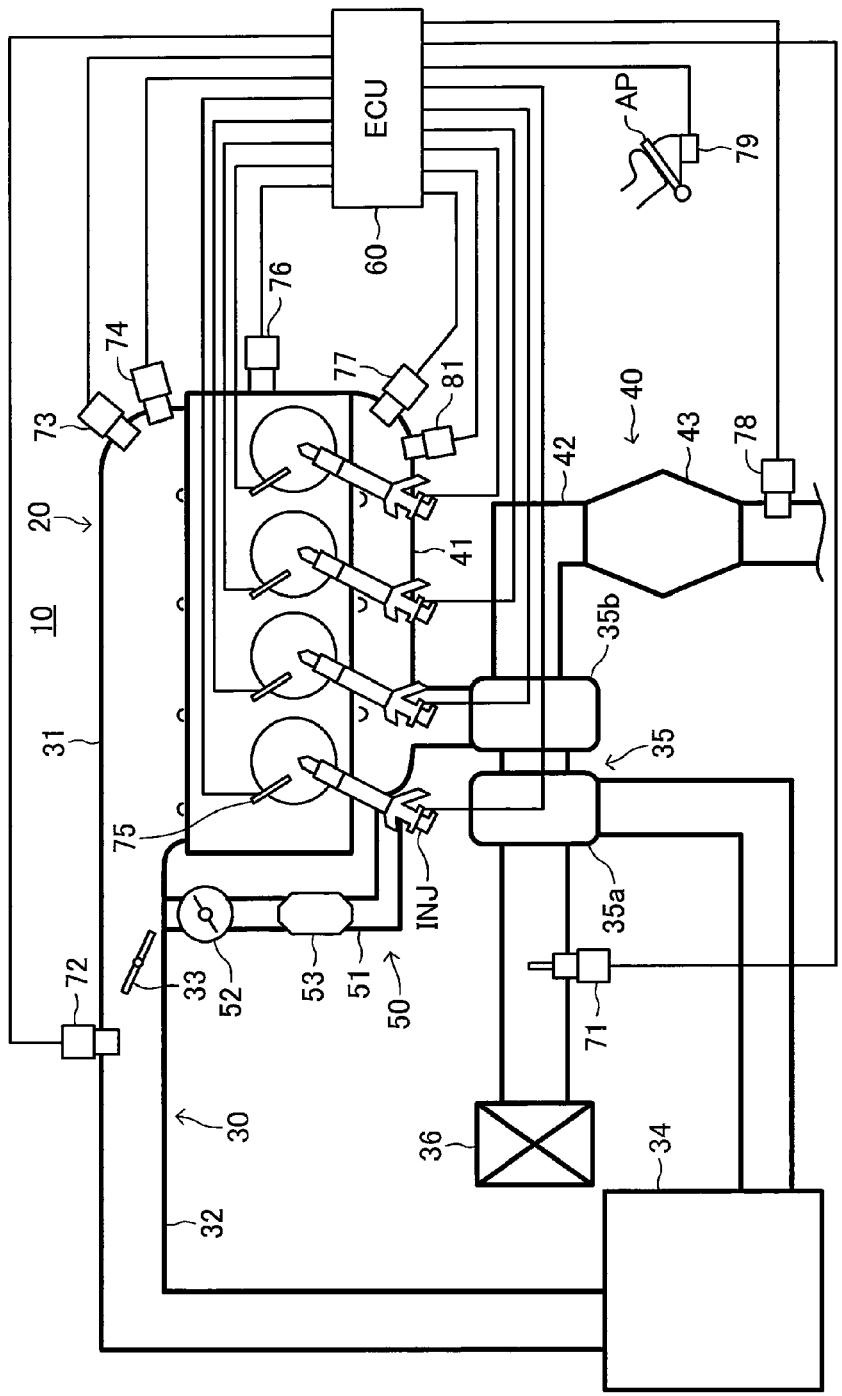
FIG. 1 is a schematic diagram showing the overall configuration of a system in which a soot discharge estimating device for an internal combustion engine according to an embodiment of the present invention is applied to a four-cylinder internal combustion engine (diesel engine).

FIG. 1 schematically shows the entire configuration of a system in which a soot discharge estimating device according to the embodiment of the present invention is applied to a four-cylinder internal combustion engine (diesel engine) 10. This system comprises an engine main body 20 including a fuel supply system; an intake system 30 for introducing gas into combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves INJ each utilizing a needle are disposed above the individual cylinders of the engine main body 20.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (DPNR) 43, which is interposed in the exhaust pipe 42. The exhaust manifold 41 and the exhaust pipe 42 constitute an exhaust passage.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the amount of exhaust gas to be circulated (exhaust-gas circulation amount, EGR-gas flow rate).

The electronic control apparatus 60 is a microcomputer which includes a CPU, ROM, RAM, backup RAM, an interface, etc., which are connected to one another by means of a bus. The ROM stores a program to be executed by the CPU, tables (maps), constants, etc. The interface contains ND converters.

The interface is connected to a hot-wire-type air flow meter 71, an intake gas temperature sensor 72, an intake pipe pressure sensor 73, an intake gas oxygen concentration sensor 74, an in-cylinder pressure sensor 75, an engine speed sensor 76, an exhaust gas temperature sensor 77, an air-fuel-ratio sensor 78, an accelerator opening sensor 79, and an exhaust gas pressure sensor 81. The interface receives respective signals from these sensors, and supplies the received signals to the CPU.

Further, the interface is connected to the fuel injection valves INJ, an unillustrated throttle valve actuator, and the EGR control valve 52; and outputs corresponding drive signals to these components in accordance with instructions from the CPU.

The hot-wire-type air flow meter 71 measures the mass flow rate of intake air passing through the intake passage (intake air quantity per unit time, new air quantity per unit time). The intake gas temperature sensor 72 detects the temperature of gas that is taken into the combustion chambers (cylinders) of the engine 10 (intake gas temperature). The intake pipe pressure sensor 73 detects the pressure of gas that is taken into the combustion chambers of the engine 10 (intake gas pressure). The intake gas oxygen concentration sensor 74 detects the oxygen concentration of gas that is taken into the combustion chambers of the engine 10 (intake gas oxygen concentration).

The in-cylinder pressure sensor 75 detects the pressure of gas within each combustion chamber (in-cylinder pressure). The engine speed sensor 76 detects the actual crank angle and an engine speed; i.e., the rotational speed of the engine 10. The exhaust gas temperature sensor 77 detects the temperature of gas discharged from the combustion chambers (exhaust gas temperature). The air-fuel-ratio sensor 78 detects the air-fuel ratio of exhaust gas downstream of the DPNR 43. The accelerator opening sensor 79 detects an amount by which an accelerator pedal AP is operated (accelerator opening). The exhaust gas pressure sensor 81 detects the pressure of gas discharged from the combustion chambers (exhaust gas pressure).

(Soot Discharge Amount Estimation Method)

Next, a Soot discharge amount estimation method according to an embodiment of the soot discharge estimating device configured as described above will be described.

Figure 2:
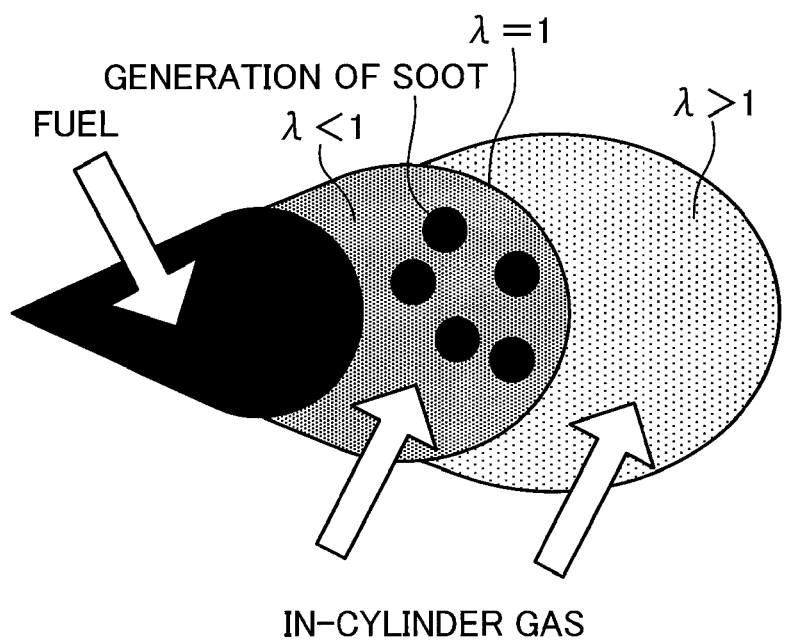
FIG. 2 is a schematic diagram showing a state in which generation of Soot mainly occurs in a region of fuel mist in which the excess air ratio is less than 1.
Figure 3:
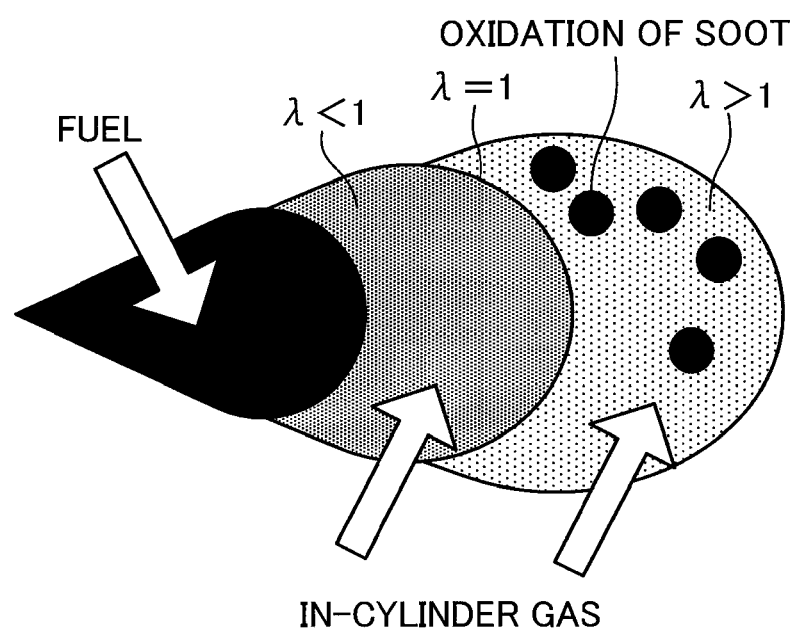
FIG. 3 is a schematic diagram showing a state in which oxidation of Soot mainly occurs in a region of fuel mist in which the excess air ratio is greater than 1.

Within in each combustion chamber, Soot is generated as a result of reaction of fuel. As shown in FIG. 2, generation of Soot takes place mainly in a region of fuel mist in which the excess air ratio λ is less than 1 (especially, in a high temperature region where λ<0.5 and the temperature is equal to or higher than about 1500K). Meanwhile, a portion of the generated Soot is oxidized. As shown in FIG. 3, oxidation of the generated Soot takes place mainly in a region of fuel mist in which the excess air ratio λ is greater than 1 (especially, in a high temperature region where the temperature is equal to or higher than about 1500K). A portion of the generated Soot which is not oxidized is discharged from the combustion chamber as Soot. In the embodiment, the amount of Soot discharged from the combustion chamber in this manner (Soot discharge amount) is estimated.

In the embodiment, the "mass of Soot discharged from the combustion chambers per unit time" is calculated as the Soot discharge amount. That is, the unit of the Soot discharge amount calculated in the embodiment is, for example, g/h or g/s.

In the embodiment, the Soot discharge amount is estimated in accordance with the following Eq. (1). In Eq. (1), the "steady discharge amount" represents a Soot discharge amount in the case where the internal combustion engine 10 is operated in a steady operation state at the current operation speed and with the current fuel injection amount. The "transient correction value" is a value (coefficient) which represents the degree of deviation of a Soot discharge amount in a transient operation state from the "steady discharge amount." Accordingly, as indicated in Eq. (1), the Soot discharge amount in the transient operation state can be calculated by means of multiplying the "steady discharge amount" by the "transient correction value." Estimation of the Soot discharge amount by Eq. (1) is executed, for example, every time a timing at which the fuel injection amount is determined comes in the course of a compression stroke of a cylinder into which fuel is injected.

$$\text{Soot discharge amount} = (\text{steady discharge amount}) \cdot (\text{transient correction value}) \quad (1)$$

Figure 4:
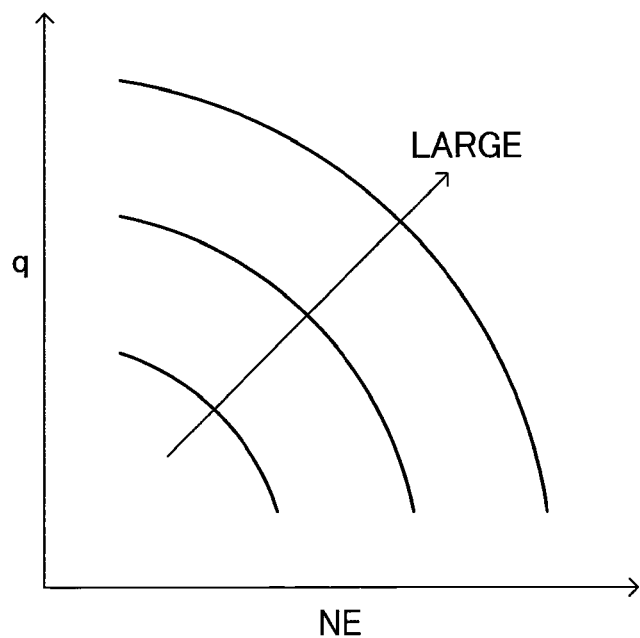
FIG. 4 is a graph showing a table for obtaining a steady discharge amount.

The steady discharge amount is acquired through table search from a table shown in FIG. 4, the current value (instantaneous value) of the engine speed NE, and the current value (value at this time) of the fuel injection amount q. The table is adapted to obtain the steady discharge amount while using the engine speed NE and the fuel injection amount q as arguments. This table can be created by repeating an experiment of measuring the Soot discharge amount in a steady operation state in which the engine speed and the fuel injection amount are maintained constant, for each of combinations of different values of the engine speed and the fuel injection amount. As shown in FIG. 4, in general, the steady discharge amount is determined such that the greater the engine speed NE and the greater the fuel injection amount q, the greater the steady discharge amount.

First, the outline of a method of calculating the transient correction value will be described. The transient correction value is calculated from the following Eq. (2). As shown in Eq. (2), in the present embodiment, the transient correction value is calculated from the product of a correction term (correction coefficient) regarding the generation of Soot, and a correction term (correction coefficient) regarding the oxidation of Soot.

$$\text{Transient correction value} = \left[\frac{A1t}{A1s} \cdot \frac{A2t}{A2s} \cdot \frac{A3t}{A3s}\right] \cdot \left[\frac{B1s}{B1t} \cdot \frac{B2t}{B2s}\right] \quad (2)$$

For calculation of the transient correction value, a plurality of factors (mist average equivalence ratio φ, mist representative temperature Tf, in-cylinder pressure Pc, etc. to be described later) that affect the Soot discharge amount are introduced. In the following description, in order to facilitate explanation, the factors are collectively referred to as "factor X." Furthermore, for each factor, there is introduced a characteristic equation which represents a change in the Soot discharge amount with the value of the factor X (e.g., for the case of Tf, see the graph shown in FIG. 6, which will be described later).

For each factor, a steady value Xs of the factor X and a transient value Xt of the factor X are acquired. The steady value Xs is a value of the factor X when the internal combustion engine 10 is operated in a steady operation state at the current operation speed and with the current fuel injection amount. For each factor, the steady value Xs is obtained, through table search, from a table for obtaining the value of the factor X, the current value (instantaneous value) of the engine speed NE, and the current value (value at this time) of the fuel injection amount q. The table is adapted to obtain the value of the factor X while using the engine speed NE and the fuel injection amount q as arguments, as in the case of the above-described "steady discharge amount." The table for obtaining the value of the factor X can be created by repeating an experiment of measuring the value of the factor X in a steady operation state in which the engine speed and the fuel injection amount are maintained constant, for each of combinations of different values of the engine speed and the fuel injection amount. In the following description, a table which is created in advance for each factor so as to obtain the steady value Xs will be referred to as MapXs (NE, q).

The transient value Xt is the current value (instantaneous value) of the factor X. As will be described later, for each factor, the transient value Xt is obtained from the result of detection by a relevant sensor, the result of estimation performed through use of a known estimation model, etc. In the steady operation state, the transient value Xt coincides with the steady value Xs. In the transient operation state, the transient value Xt may deviate from the steady value Xs. That is, even for the same combination of the current value (instantaneous value) of the engine speed NE and the current value (value at this time) of the fuel injection amount q, the transient value Xt may deviate from the steady value Xs. Due to this deviation, the Soot discharge amount deviates from a steady-state fit value.

For each factor, a steady characteristic value regarding the factor X (for example, in the case of Tf, A1$s$ in Eq. (2)) is obtained from the steady value Xs and the above-described "characteristic equation" for the factor X; and a transient characteristic value regarding the factor X (for example, in the case of Tf, A1$t$ in Eq. (2)) is obtained from the transient value Xt and the above-described "characteristic equation" for the factor X. The steady characteristic value and the transient characteristic value are each represented by a variable (A1, etc.) which represents the corresponding characteristic value and which is suffixed with "s" or "t."

For each factor, a ratio between the steady characteristic value and the transient characteristic value is calculated (for example, in the case of Tf, "A1$t$/A1$s$" in Eq. (2)). The "ratio between the steady characteristic value and the transient characteristic value" for the factor X serves as a value which represents the degree of deviation of the Soot discharge amount from the steady discharge amount attributable to the "deviation of the transient value Xt from the steady value Xs" which may arise in the transient operation state.

As shown in Eq. (2), the transient correction value is calculated by means of multiplying together the values of the "ratio between the steady characteristic value and the transient characteristic value" obtained for the respective factors. As a result, the transient correction value is calculated as a "value (coefficient) representing the degree of deviation of the Soot discharge amount from the steady discharge amount" in consideration of all the influence of the "deviation of the transient value Xt from the steady value Xs" for each factor in the transient operation state. Next, for each of the correction terms shown in Eq. (2), the "ratio between the steady characteristic value and the transient characteristic value" for each factor will be described in detail one by one.
<Generation Correction Term>

In a correction term regarding the generation of Soot (generation correction term), factors that affect the speed at which Soot is generated as a result of reaction of fuel (Soot generation speed) are used as the above-described factor. Specifically, mist representative temperature Tf, in-cylinder pressure Pc, and mist average equivalence ratio $\phi$ are introduced as the "factor that affects the Soot generation speed." The characteristic values A1, A2, and A3 in Eq. (2) correspond to the mist representative temperature Tf, the in-cylinder pressure Pc, and the mist average equivalence ratio $\phi$, respectively. The factors will be described on a factor-by-factor basis.
<<A1$t$/A1$s$ Based on Mist Representative Temperature Tf>>

Figure 5:
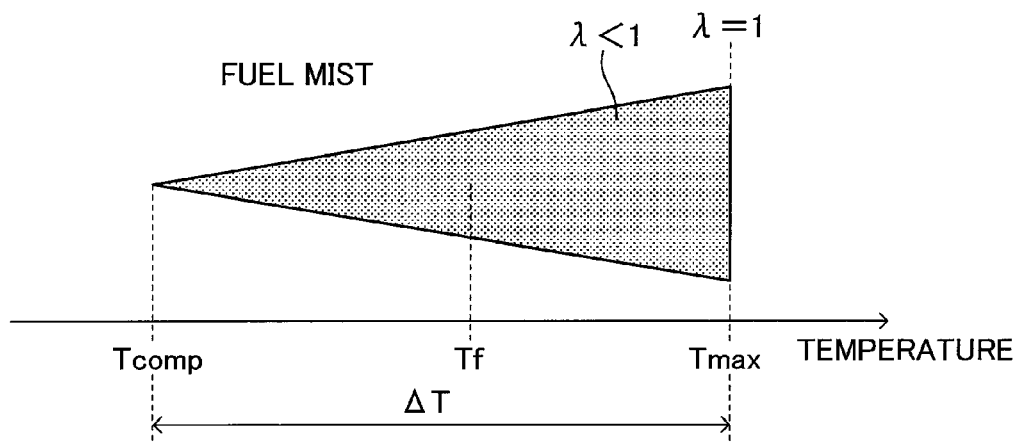
FIG. 5 is a schematic diagram showing a temperature distribution within fuel mist.

The mist representative temperature Tf is a temperature which represents different temperatures at different positions within fuel mist (in particular, in a region in which the excess air ratio $\lambda$ is less than 1 and Soot is generated). As shown in FIG. 5, in the region of fuel mist injected from an injection hole in which $\lambda$<1, a temperature distribution is produced such that the temperature gradually increases from a compression end temperature Tcomp to a maximum flame temperature Tmax as the distance from the injection hole (the root of mist; $\lambda$=0) increases (i.e., as the excess air ratio $\lambda$ increases from 0 to 1).

In the present example, an average temperature, which is the average of the compression end temperature Tcomp and the maximum flame temperature Tmax, a centroid temperature, which is a temperature obtained by weighting the temperature corresponding to each value of $\lambda$ by the amount of mist (gas mixture) distributing as a function of $\lambda$, or the like can be employed as the mist representative temperature Tf.

As described above, the steady value Tfs of the mist representative temperature Tf is obtained, through table search, from a previously created table MapTfs (NE, q), the current value (instantaneous value) of the engine speed NE, and the current value (value at this time) of the fuel injection amount q.

The transient value Tft of the mist representative temperature Tf can be obtained from the current value (value at this time) of the compression end temperature Tcomp and the current value (value at this time) of the maximum flame temperature Tmax. The temperatures Tcomp and Tmax can be obtained, by use of a known method, from intake gas temperature, intake gas pressure, and intake gas oxygen concentration, which can be detected by the above-described sensors; the entire amount of gas taken in the combustion chamber (in-cylinder gas amount); etc. The in-cylinder gas amount can be determined from the intake gas temperature, the intake gas pressure, the volume of the combustion chamber at the start of compression, and an equation of state of gas.

In the present example, a characteristic equation for obtaining a "characteristic value A1 regarding the Soot discharge amount" for the mist representative temperature Tf is represented by use of a Gaussian function as shown in the following Eq. (3) and FIG. 6. The reason for the use of the Gaussian function is that the Soot generation amount (generation speed) becomes the maximum at a certain temperature Tp (e.g., about 1895K), and decreases as the temperature deviates from Tp.

$$A1 = \exp\left\{-\frac{(Tf - Tp)^2}{2 \cdot \sigma^2}\right\} \quad (3)$$

In the present example, the standard deviation $\sigma$ (see FIG. 6) used in Eq. (3) can be obtained from the relation that a value obtained by multiplying together "0.68" and half (=$\Delta$T/2) of the difference $\Delta$T (see FIG. 5) between the compression end temperature Tcomp and the maximum flame temperature Tmax is equal to 2$\sigma$. The value "0.68" is the "probability at which an observed value of a random variable which follows a Gaussian distribution falls within a range of the average value±(1× the standard deviation)." For example, when $\Delta$T=1200K, $\sigma$ is approximately 200K.

Figure 6:
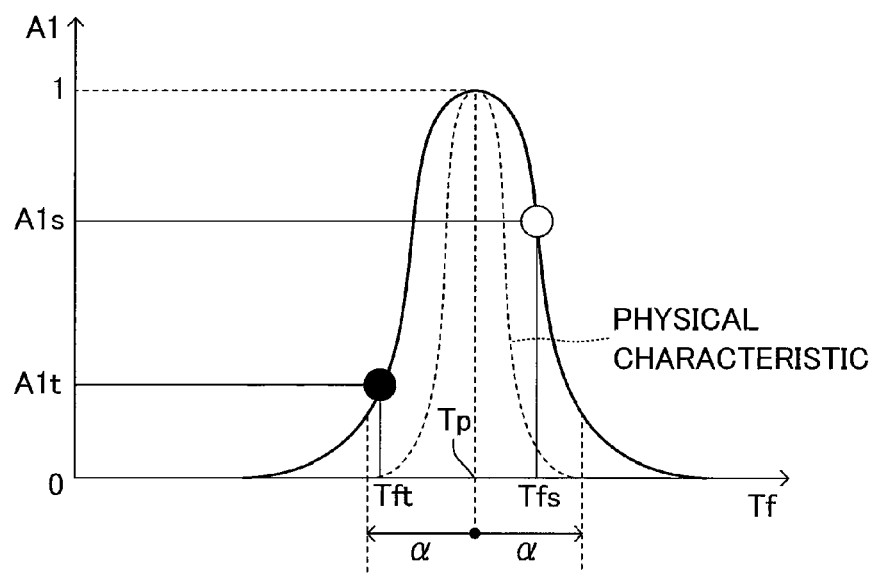
FIG. 6 is a graph showing a change in a "characteristic value A1 regarding the Soot discharge amount" with mist representative temperature Tf.

A solid line of FIG. 6 shows an example change in the characteristic value A1 with Tf, which is obtained through use of the standard deviation $\sigma$ determined as described above. Meanwhile, a broken line of FIG. 6 shows a (actual) physical characteristic of the Soot discharge amount in a local region (a region where the temperature is uniform) with temperature. This physical characteristic can be obtained through an experiment or the like. As can be understood through comparison between the solid line and the broken line of FIG. 6, the standard deviation σ determined as described above is greater than the standard deviation corresponding to the above-described physical characteristic.

As shown in FIG. 6, the steady characteristic value A1s is obtained from the steady value Tfs and Eq. (3) (that is, through substitution of Tfs for Tf of Eq. (3)) (see a large white circle); and the transient characteristic value A1t is obtained from the transient value Tft and Eq. (3) (that is, through substitution of Tft for Tf of Eq. (3)) (see a large black circle). Then, "A1t/A1s," which is the "ratio between the steady characteristic value and the transient characteristic value," is calculated (see Eq. (2)). This "A1t/A1s" represents the degree of deviation of the Soot discharge amount (instantaneous value) from the steady discharge amount attributable to the "deviation of the transient value Tft from the steady value Tfs" in the transient operation state.

As described above, different temperatures at different portions within a region of fuel mist in which the excess air ratio is less than 1 are represented by a single temperature Tf, and the standard deviation σ used in a characteristic equation (Gaussian function) for obtaining the "characteristic value A1 regarding the Soot discharge amount" for Tf is set to a value greater than the standard deviation corresponding to the above-described physical characteristic. Through this procedure, without increasing the calculation load, "A1t/A1s" can be calculated as a value which accurately represents the degree of deviation of the Soot discharge amount (instantaneous value) from the steady discharge amount attributable to the "deviation of the transient value Tft from the steady value Tfs" in a transient operation state.

<<A2t/A2s Based on in-Cylinder Pressure Pc>>

The in-cylinder pressure Pc is the pressure within the combustion chamber at a predetermined timing. In the present example, the pressure within the combustion chamber at the time when the intake valve is closed, or the like can be employed as the in-cylinder pressure Pc. Since the pressure within the combustion chamber at the time when the intake valve is closed is considered to be approximately equal to the intake gas pressure, it can be obtained from the intake pipe pressure sensor 73. Alternatively, the compression end pressure may be employed as the in-cylinder pressure Pc. The compression end pressure can be obtained, for example, from the in-cylinder pressure sensor 75.

As described above, the steady value Pcs of the in-cylinder pressure Pc can be obtained, through table search, from the previously created table MapPcs (NE, q), the current value (instantaneous value) of the engine speed NE, and the current value (value at this time) of the fuel injection amount q.

As described above, the transient value Pct of the in-cylinder pressure Pc can be obtained from the intake pipe pressure sensor 73, the in-cylinder pressure sensor 75, etc.

Figure 7:
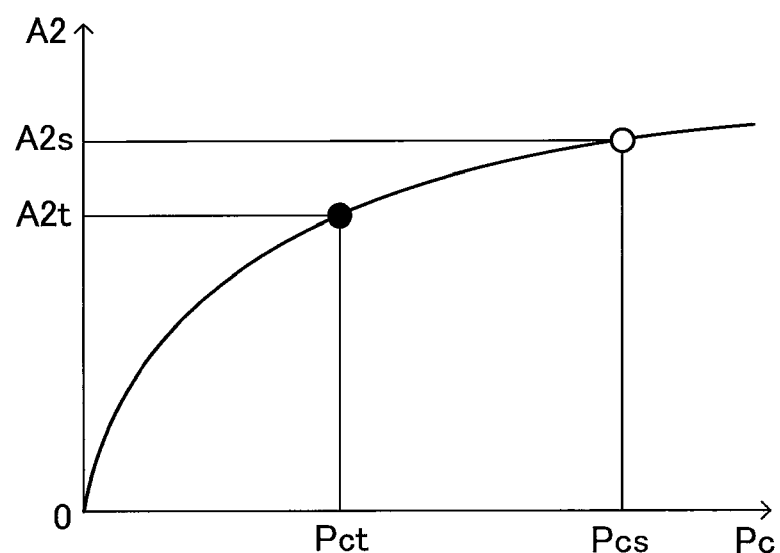
FIG. 7 is a graph showing a change in a "characteristic value A2 regarding the Soot discharge amount" with in-cylinder pressure Pc.

In the present example, a characteristic equation for obtaining the "characteristic value A2 regarding the Soot discharge amount" for the in-cylinder pressure Pc is represented by the following Eq. (4). FIG. 7 shows a change in the characteristic value A2 with Pc. The reason for employment of Eq. (4) is that the Soot generation amount (generation speed) changes in proportion to the square root of the pressure.

$$A2 = \sqrt{Pc} \quad (4)$$

As shown in FIG. 7, the steady characteristic value A2s is obtained from the steady value Pcs and Eq. (4) (that is, through substitution of Pcs for Pc of Eq. (4)) (see a large white circle); and the transient characteristic value A2t is obtained from the transient value Pct and Eq. (4) (that is, through substitution of Pct for Pc of Eq. (4)) (see a large black circle).

Then, "A2t/A2s," which is the "ratio between the steady characteristic value and the transient characteristic value," is calculated (see Eq. (2)). This "A2t/A2s" represents the degree of deviation of the Soot discharge amount (instantaneous value) from the steady discharge amount attributable to the "deviation of the transient value Pct from the steady value Pcs" in the transient operation state.

<<A3t/A3s Based on Mist Average Equivalence Ratio φ at Timing of Starting Ignition>>

The mist average equivalence ration is an average ratio of an equivalence ratio in fuel mist, which momentarily diffuses (spreads) in the combustion chamber after the injection of the fuel. The equivalence ratio is a value obtained by multiplying the ratio of fuel amount to air quantity by the stoichiometric air-fuel ratio. Some gas in the combustion chamber, which gas is mixed with the injected fuel to form the fuel mist, is defined as "mist forming gas" below. The mist average equivalence ratio is a value obtained by multiplying a ratio of the total amount (total mass) of the injected fuel to an air quantity (mass) containing oxygen in an amount approximately equal to the amount of oxygen contained in the mist forming gas by the stoichiometric air-fuel ratio. The situation in which the fuel mist momentarily spreads after the fuel infection means that the amount of the mist forming gas increases, i.e., the mist average equivalence ratio decreases, after the fuel injection.

The calculation of the mist average equivalence ratio φ at the timing of starting ignition will briefly be described. The amount (mass) of the mist forming gas, which momentarily increases after the start of the fuel injection, can be expressed as a function of an elapsed time after the start of the fuel injection based upon, for example, an experimental equation introduced on "Studies on the Penetration of Fuel Spray of Diesel Engine", Yutaro Wakuri, Masaru Fujii, Tatsuo Amitani, Reijiro Tsuneya, Transactions of the Japan Society of Mechanical Engineers, 25-156 (1959), pp. 820 (hereinafter referred to as "Non-Patent Document 2"). This calculation method is also described in detail in Japanese Patent Application Laid-Open (kokai) No. 2007-46477, for example.

The ignition delay period is specified as a period (crank angle, or time) between a point in time when fuel injection starts (in the case where pilot injection is performed prior to main injection, a point in time when the main injection starts) and a point in time when ignition starts. The ignition delay period can be calculated by using the timing of starting ignition specified based upon the change in the in-cylinder pressure detected by the in-cylinder pressure sensor 75, for example. The ignition delay period can also be estimated based upon one of known estimation methods.

Accordingly, the time equal to the ignition delay period is substituted for the above-mentioned "function for obtaining the amount of the mist forming gas from the elapsed time after the start of the fuel injection", whereby the amount Gs of the mist forming gas at the timing of starting ignition can be obtained.

The amount (mass) Go2 of the oxygen contained in the mist forming gas at the timing of starting ignition can be represented by the following Eq. (5). In Eq. (5), Roxc is the in-cylinder oxygen concentration (the concentration of oxygen in the gas taken in the combustion chamber). A quantity (mass) Gair of air containing oxygen in a quantity equal to Go2 can be represented by the following Eq. (6). The value 0.232 is a ratio (mass ratio) (oxygen fraction in air) of the oxygen contained in air. The mist average equivalence ratio φ at the timing of starting ignition can be calculated in accordance with the following Eq. (7) by using the Gair, the total amount q of the injected fuel, and the stoichiometric air-fuel ratio Afth.

$$G_{O2} = Gs \cdot Roxc \qquad (5)$$

$$Gair = \frac{G_{O2}}{0.232} \qquad (6)$$

$$\phi = \frac{q}{Gair} \cdot AFth \qquad (7)$$

Figure 8:
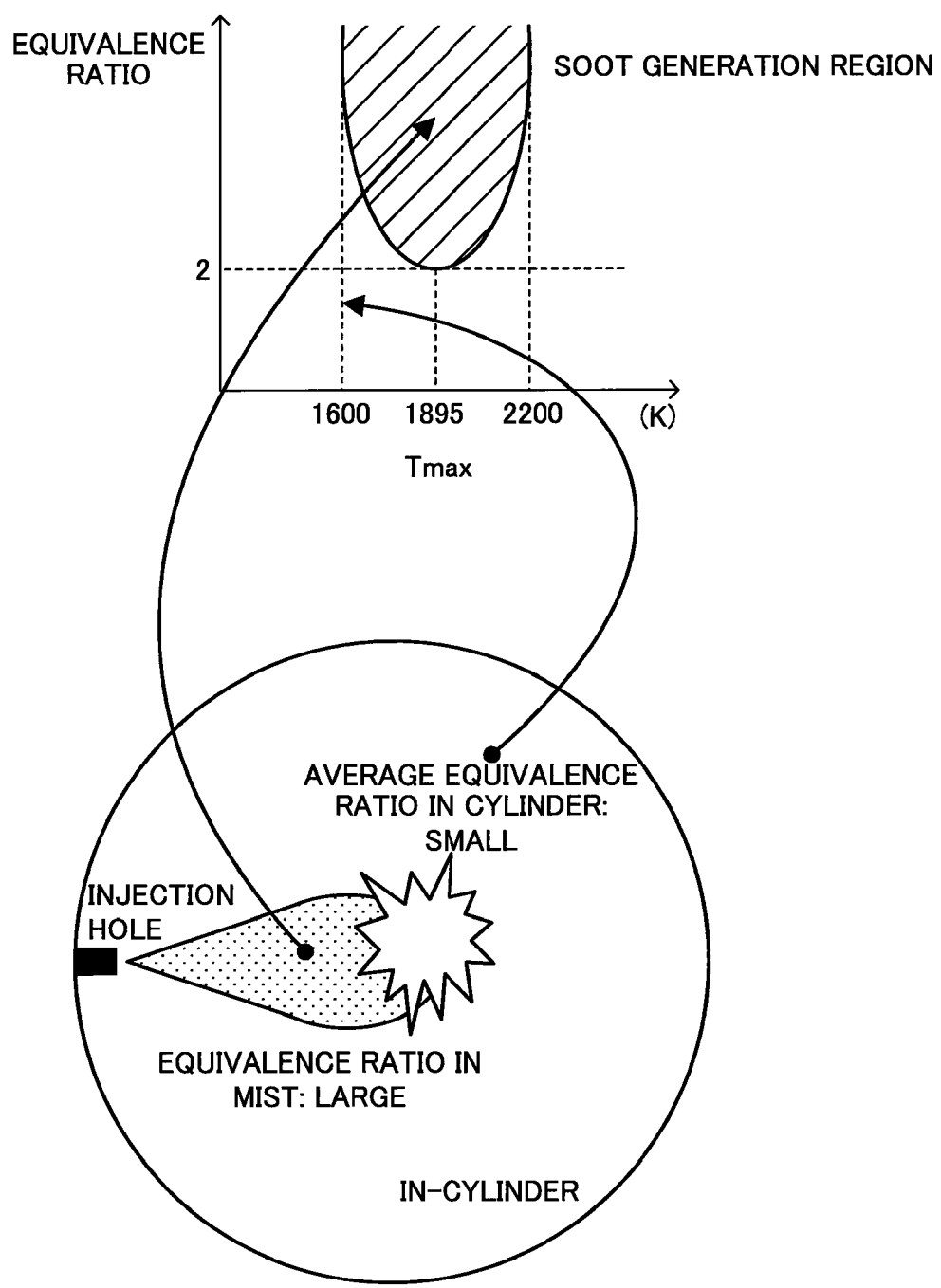
FIG. 8 is a diagram for describing a relationship among a flame temperature, an equivalence ratio, and a Soot generation region, and a difference between a mist equivalence ratio at the timing of starting ignition and an average equivalence ratio in all cylinders.

As shown in FIG. 8, it has widely been known that Soot can be produced in a region (see the hatched region) where the flame temperature Tmax involved with the combustion of the fuel falls within a predetermined range (Tmax is not more than about 1600 K and not less than about 2200 K), and where the equivalence ratio is not less than a predetermined value (about 2 or more), and that Soot cannot be produced outside this region. This region is referred to as "Soot generation region" below.

The value obtained by multiplying the ratio of the "total amount of the injected fuel" to the "total quantity of air taken in the combustion chamber" by the stoichiometric air-fuel ratio is defined as "average equivalence ratio in all cylinders". The discharge amount of Soot more strongly depends upon the mist average equivalence ratio $\phi$ at the timing of starting ignition than upon the average equivalence ratio in all cylinders, and as the mist average equivalence ratio $\phi$ at the timing of starting ignition is large (in the Soot generation region), the discharge amount of Soot increases.

The mist average equivalence ratio $\phi$ at the timing of starting ignition is significantly large compared to the average equivalence ratio in all cylinders. As shown in FIG. 8, when the average equivalence ratio in all cylinders is smaller than 2 (in the region outside the Soot generation region), the situation in which the mist average equivalence ratio $\phi$ at the timing of starting ignition becomes greater than 2 (the situation in which the mist average equivalence ratio $\phi$ at the timing of starting ignition falls within the Soot generation region) may occur. Accordingly, when the discharge amount of Soot is estimated in consideration of the average equivalence ratio in all cylinders, the discharge amount of Soot is estimated to be slightly lower, which means the accuracy in estimating the discharge amount of Soot is deteriorated. On the contrary, in the present example, the discharge amount of Soot is estimated in consideration of the "mist average equivalence ratio $\phi$ at the timing of starting ignition", which strongly depends upon the discharge amount of Soot.

Figure 9:
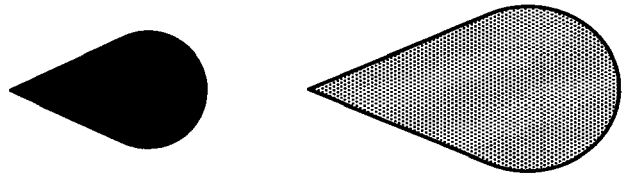
FIG. 9 is a diagram for describing a relationship among an ignition delay period, the mist average equivalence ratio, and the Soot discharge amount.

As shown in FIG. 9, as the ignition delay period is short, the magnitude (i.e., the amount Gs of the mist forming gas at the timing of starting ignition) of the fuel mist at the timing of starting ignition decreases. With this, the mist average equivalence ratio $\phi$ at the timing of starting ignition increases. As a result, Soot is easy to be generated. As described above, the "mist average equivalence ratio $\phi$ at the timing of starting ignition" becomes the "factor that affects the Soot generation speed."

As described above, the steady value $\phi s$ of the mist average equivalence ratio $\phi$ at the timing of starting ignition is obtained, through table search, from a previously created table Map$\phi$s (NE, q), the current value (instantaneous value) of the engine speed NE, and the current value (value at this time) of the fuel injection amount q.

The transient value $\phi t$ of the mist average equivalence ratio $\phi$ at the timing of starting ignition (the value for the injected fuel at this time at the timing of starting ignition) can be obtained in accordance with Eq. (7).

Figure 10:
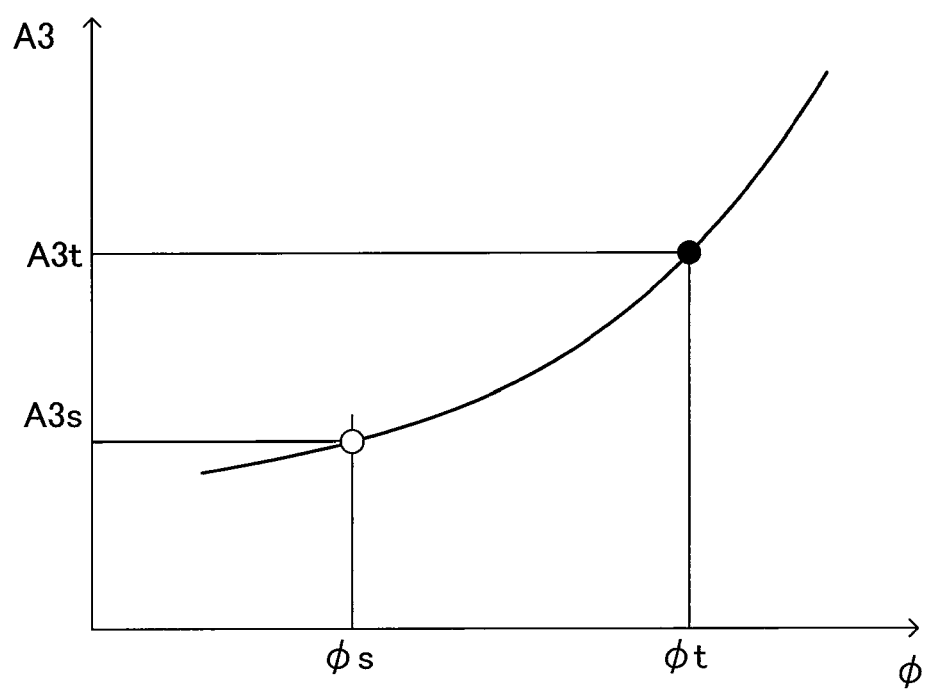
FIG. 10 is a graph showing a change in a "characteristic value A3 regarding the Soot discharge amount" with mist average equivalence ratio $\phi$.

A characteristic equation for obtaining the "characteristic value A3 regarding the Soot discharge amount" for the mist average equivalence ratio $\phi$ at the timing of starting ignition is represented by the following Eq. (8) in the present example. a and b are positive constants. FIG. 10 shows a change in the characteristic value A3 with $\phi$. The reason why Eq. (8) is employed is that the Soot is easy to be generated as $\phi$ increases. Notably, a characteristic equation (representing an upwardly convexed curve or a linear characteristic) different from Eq. (8) may be employed, so long as the employed characteristic equation is such that the greater the value $\phi$, the greater the characteristic value.

$$A3 = a \cdot \phi^2 + b \qquad (8)$$

As shown in FIG. 10, the steady characteristic value $A3s$ is obtained from the steady value $\phi s$ and Eq. (8) (that is, through substitution of $\phi s$ for $\phi$ of Eq. (8)) (see a large white circle); and the transient characteristic value $A3t$ is obtained from the transient value $\phi t$ and Eq. (8) (that is, through substitution of $\phi t$ for $\phi$ of Eq. (8)) (see a large black circle).

Then, "$A3t/A3s$," which is the "ratio between the steady characteristic value and the transient characteristic value," is calculated (see Eq. (2)). This "$A3t/A3s$" represents the degree of deviation of the Soot discharge amount (instantaneous value) from the steady discharge amount attributable to the "deviation of the transient value $\phi t$ from the steady value $\phi s$" in the transient operation state.

As described above, since the "$A3t/A3s$" is added to the generation correction term, it is possible to express that the Soot is easy to be produced, and hence, the discharge amount of Soot increases, because the mist average equivalence ratio $\phi$ at the timing of starting ignition increases due to some reasons. As can be understood from Eq. (5) to Eq. (7), as the in-cylinder oxygen concentration Roxc is small, the "mist average equivalence ratio $\phi$ at the timing of starting ignition" increases, even if the ignition delay period is fixed (accordingly, even if the amount Gs of the mist forming gas at the timing of starting ignition is fixed). Accordingly, it is possible to express that, under the situation in which the ignition delay period is fixed, the discharge amount of Soot increases, as the in-cylinder oxygen concentration Roxc is smaller.

In the present example, the "mist average equivalence ratio $\phi$ at the timing of starting ignition" is employed as the "factor that affects the Soot generation speed" for the "$A3t/A3s$" in the Eq. (2). However, "q/Gair", i.e., the "ratio of the fuel amount to the air quantity in the fuel mist at the timing of starting ignition" may be employed.

<Oxidation Correction Term>

In a correction term regarding the oxidation of Soot (oxidation correction term), factors that affect the speed at which the generated Soot is oxidized (Soot oxidation speed) are used as the above-described "factor." Specifically, oxidation region representative temperature To1 and in-cylinder oxygen concentration Roxc are introduced as the "factor that affects the Soot oxidation speed." The characteristic values B1 and B2 in the above-described Eq. (2) correspond to the oxidation region representative temperature To1 and the in-cylinder oxygen concentration Roxc, respectively. The factors will be described on a factor-by-factor basis.

<<B1s/B1t Based on Oxidation Region Representative Temperature To1>>

The oxidation region representative temperature To1 is a temperature which represents different temperatures at different locations within fuel mist (in particular, within a region in which the excess air ratio $\lambda$ is greater than 1, and Soot is oxidized); in particular, a representative temperature within a region of fuel mist in which the excess air ratio λ is greater than 1 in the first half of combustion of fuel; i.e., an intermediate stage in which fuel mist is dispersing (a high-temperature mist state in which combustion continues).

Figure 11:
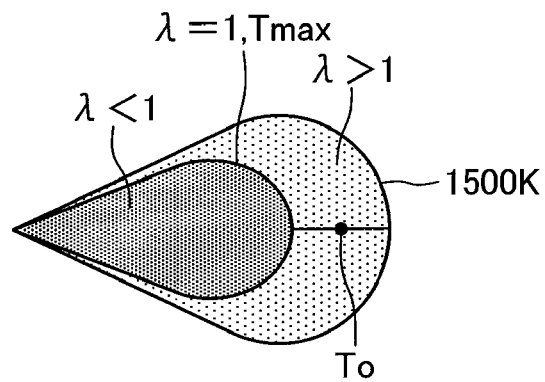
FIG. 11 is a diagram used for explaining calculation of oxidation region representative temperature To1.

As shown in FIG. 11, in a region in fuel mist in which λ>1, a temperature distribution is produced such that the temperature gradually decreases from the maximum flame temperature Tmax with separation from a portion corresponding to the maximum flame temperature Tmax (λ=1) toward the forward end of the mist (that is, as the excess air ratio λ increases from 1). In addition, most Soot oxidation reactions occur at temperatures equal to or higher than 1500K.

In view of the above, in the present example, for example, the average between the maximum flame temperature Tmax and 1500K or the like is employed as the oxidation region representative temperature To1 as shown in the following Eq. (9).

$$To1=(Tmax+1500)/2 \quad (9)$$

As described above, the steady value $To1s$ of the oxidation region representative temperature To1 is obtained, through table search, from a previously created table MapTo1s (NE, q), the current value (instantaneous value) of the engine speed NE, and the current value (value at this time) of the fuel injection amount q.

The transient value $To1t$ of the oxidation region representative temperature To1 can be obtained from the above-described Eq. (9). As described above, Tmax can be obtained, by use of a known method, from the intake gas temperature, the intake gas pressure, and the intake gas oxygen concentration, which can be detected by the above-described sensors; the above-described in-cylinder gas amount; etc. Notably, Tmax decreases as Roxc decreases.

Figure 12:
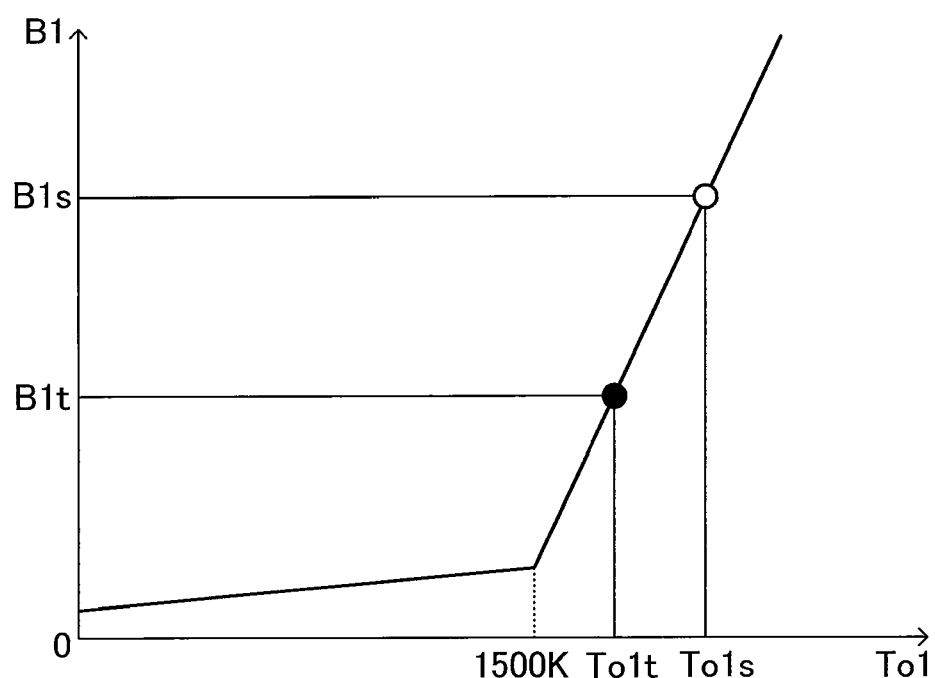
FIG. 12 is a graph showing a change in a "characteristic value B1 regarding the Soot discharge amount" with the oxidation region representative temperature To1.

In the present example, a characteristic equation for obtaining the "characteristic value B1 regarding the Soot discharge amount" for the oxidation region representative temperature To1 is represented by the following Eq. (10). q1, q2, h1, and h2 are positive constants (q2>q1). FIG. 12 shows a change in the characteristic value B1 with To1. As shown in FIG. 12, the characteristic value B1 is very small when To1 is lower than 1500K, and substantially increases with To1 when To1 becomes equal to or higher than 1500K. The reason for employment of such a characteristic is that, as described above, most of Soot oxidation reactions occur at temperatures equal to or higher than 1500K, and the Soot oxidation reaction speed increases with temperature when the temperature is equal to or higher than 1500K.

$$B1=q1 \cdot To1+h1(To1 \leq 1500K)$$

$$q2 \cdot To1-h2(To1>1500K) \quad (10)$$

As shown in FIG. 12, the steady characteristic value $B1s$ is obtained from the steady value $To1s$ and Eq. (10) (that is, through substitution of $To1s$ for To1 of Eq. (10)) (see a large white circle); and the transient characteristic value $B1t$ is obtained from the transient value To1t and Eq. (10) (that is, through substitution of $To1t$ for To1 of Eq. (10)) (see a large black circle).

Then, "$B1t/B1s$," which is the "ratio between the steady characteristic value and the transient characteristic value," is calculated (see Eq. (2)). This "$B1t/B1s$" represents the degree of deviation of the Soot discharge amount (instantaneous value) from the steady discharge amount attributable to the "deviation of the transient value $To1t$ from the steady value $To1s$" in the transient operation state.

Notably, as the oxidation of Soot proceeds, the Soot discharge amount decreases. Accordingly, in the oxidation correction term, when a characteristic value which increases with the progress of the oxidation of Soot is used, in contrast to the above-described generation correction term (="the transient characteristic value/the steady characteristic value"), a fraction "the steady characteristic value/the transient characteristic value" in which the values of the numerator and the denominator are reversed is used as the ratio between the "steady characteristic value and the transient characteristic value."

As described above, different temperatures at different portions within a region of fuel mist in which the excess air ratio λ is greater than 1 (in particular, in the first half of combustion) are represented by a single temperature To1. Through this procedure, without increasing the calculation load, "$B1t/B1s$" can be calculated as a value which accurately represents the degree of deviation of the Soot discharge amount (instantaneous value) from the steady discharge amount attributable to the "deviation of the transient value $To1t$ from the steady value $To1s$" in a transient operation state.

In addition, it is possible to express that, when the maximum flame temperature Tmax (accordingly, the oxidation region representative temperature To1) decreases as a result of a decrease in the in-cylinder oxygen concentration Roxc, the degree of oxidation of Soot decreases (accordingly, the Soot discharge amount increases).

<<$B2s/B2t$ Based on in-Cylinder Oxygen Concentration Roxc>>

The in-cylinder oxygen concentration Roxc is the oxygen concentration of gas within the combustion chamber. Since the oxygen concentration of gas within the combustion chamber is considered to be approximately equal to the oxygen concentration of gas taken in the combustion chamber, it can be obtained from the intake gas oxygen concentration sensor 74.

As described above, the steady value Roxcs of the in-cylinder oxygen concentration Roxc is obtained, through table search, from a previously created table MapRoxcs (NE, q), the current value (instantaneous value) of the engine speed NE, and the current value (value at this time) of the fuel injection amount q.

The transient value Roxct of the in-cylinder oxygen concentration Roxc can be obtained from the intake gas oxygen concentration sensor 74 as described above.

Figure 13:
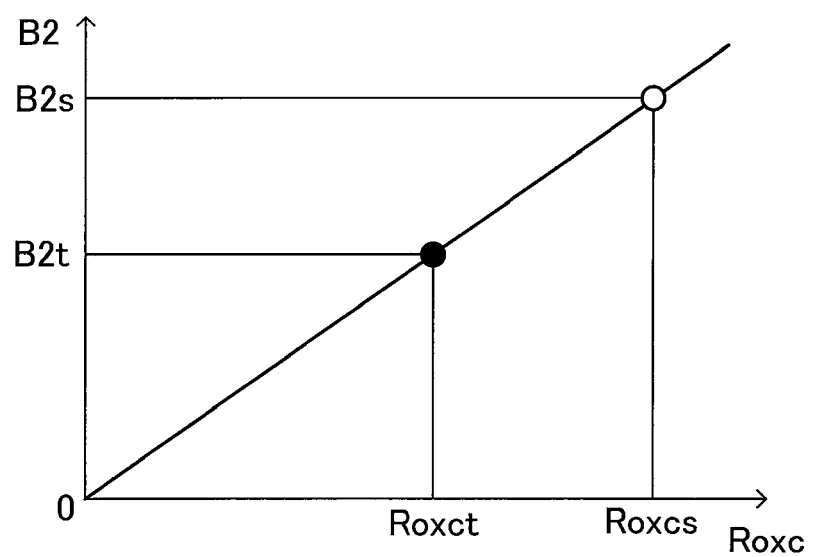
FIG. 13 is a graph showing a change in a "characteristic value B2 regarding the Soot discharge amount" with in-cylinder oxygen concentration Roxc.

In the present example, a characteristic equation for obtaining the "characteristic value B2 regarding the Soot discharge amount" for the in-cylinder oxygen concentration Roxc is represented by the following Eq. (11). FIG. 13 shows a change in the characteristic value B2 with Roxc. The reason for employment of Eq. (11) is that the Soot oxidation speed changes in proportion to the in-cylinder oxygen concentration.

$$B2=Roxc \quad (11)$$

As shown in FIG. 13, the steady characteristic value $B2s$ is obtained from the steady value Roxcs and Eq. (11) (that is, through substitution of Roxcs for Roxc of Eq. (11)) (see a large white circle); and the transient characteristic value $B2t$ is obtained from the transient value Roxct and Eq. (11) (that is, through substitution of Roxct for Roxc of Eq. (11)) (see a large black circle).

Then, "$B2s/B2t$," which is the "ratio between the steady characteristic value and the transient characteristic value," is calculated (see Eq. (2)). This "$B2s/B2t$" accurately represents the degree of deviation of the Soot discharge amount (instantaneous value) from the steady discharge amount attributable to the "deviation of the transient value Roxct from the steady value Roxcs" in the transient operation state.

As described above, according to the embodiment of the soot discharge estimating device of the present invention, the Soot discharge amount can be calculated by means of multiplying the "steady discharge amount" by the "the transient correction value" (see Eq. (1)). The "steady discharge amount" is a Soot discharge amount in the case where the internal combustion engine is operated in a steady operation state at the current operation speed and with the current fuel injection amount, and is obtained through table search. The "transient correction value" is a coefficient that represents the degree of deviation of the Soot discharge amount in a transient operation state from the "steady discharge amount." When the "transient correction value" is calculated, for each of a plurality of factors that affect the Soot discharge amount, a steady value (value obtained through table search) and a transient value (current value) of each factor are substituted for a corresponding characteristic equation regarding the Soot discharge amount for the factor, whereby a steady characteristic value and a transient characteristic value are obtained. The "ratio between the steady characteristic value and the transient characteristic value" is then calculated. The "transient correction value" is calculated from the product of the values of the "ratio between the steady characteristic value and the transient characteristic value" obtained for the respective factors (see Eq. (2)).

Thus, the "transient correction value" is calculated as a "coefficient that represents the degree of deviation of the Soot discharge amount from the steady discharge amount" in consideration of all the influence of the "deviation of the transient value from the steady value" for each factor in a transient operation state. As a result, in a transient operation state, the Soot discharge amount can be accurately estimated through processing which imposes a small amount of calculation load on the CPU; i.e., table search for acquisition of the "steady discharge amount" and calculation of the "transient correction value."

In particular, the "mist average equivalence ratio φ at the timing of starting ignition" that strongly and directly affects the "Soot generation speed" is included as one of "factors" (see the "A3t/A3s" in the Eq. (2)). Therefore, it is possible to express that the mist average equivalence ratio 4, at the timing of starting ignition increases for some reasons, and hence, the Soot is easily produced, and the discharge amount of Soot increases.

In the following, an additional explanation is provided for the case where the "A3t/A3s" based upon the mist average equivalence ratio φ at the timing of starting ignition" is added in the generation correction term (that is, the case where the correction based upon φ is considered) as shown in the above described Eq. (2). In this case, as described above, the transient correction value may be calculated while the correction based upon φ is always performed (see Eq. (2)). On the other hand, the transient correction value may be calculated by taking the correction based upon φ into consideration, only when a predetermined condition is satisfied (see the Eq. (2)), and calculated in accordance with the following Eq. (12) (which is an equation obtained by removing the term "A3t/A3s" from the Eq. (2)), in which the correction based upon φ is not taken into consideration, when the predetermined condition is not satisfied. In the following, an example of processing for various cases in which the transient correction value is calculated in consideration of the correction based upon φ only when the predetermined condition is satisfied will be described with reference to FIGS. 14 and 15.

$$\text{Transient correction value} = \left| \frac{A1t}{A1s} \cdot \frac{A2t}{A2s} \right| \cdot \left| \frac{B1s}{B1t} \cdot \frac{B2t}{B2s} \right| \quad (12)$$

Figure 14:
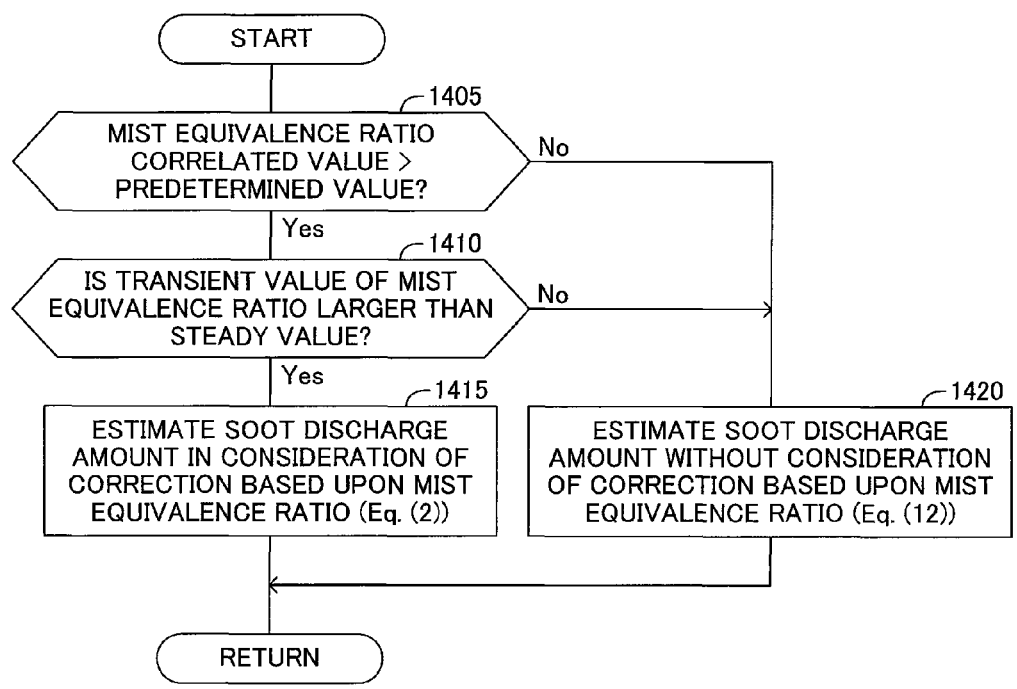
FIG. 14 is a flowchart showing an example of processing for the case where the Soot discharge amount is estimated in consideration of correction based on the mist average equivalence ratio only under a predetermined condition.

First, an example shown in FIG. 14 will be described. In this example, first, in step 1405, a determination is made as to whether or not a mist equivalence ratio correlated value at the timing of starting ignition is larger than a predetermined value. Here, the above-mentioned "mist average equivalence ratio φ at the timing of starting ignition", the "ratio (q/Gair) of the fuel amount to the air quantity in the fuel mist in the timing of starting ignition", etc. can be used as the mist equivalence ratio correlated value.

When a "Yes" determination is made in step 1405, in step 1410, a determination is made as to whether or not the transient value φt of the mist average equivalence ratio φ at the timing of starting ignition is larger than the steady value φs or not (i.e., whether or not the φt has deviated from the φs in such a direction that the Soot discharge amount increases).

In the case where a "Yes" determination is made in both steps 1405 and 1410, the transient correction value is calculated by use of Eq. (2) in step 1415. That is, the Soot discharge amount is estimated in consideration of the correction based on the "mist average equivalence ratio φ at the timing of starting ignition". Meanwhile, in the case where a "No" determination is made in step 1405 or 1410, the transient correction value is calculated by use of Eq. (12) in step 1420. That is, the Soot discharge amount is estimated without consideration of the correction based on the mist average equivalence ratio φ at the timing of starting ignition".

As described above, in the example shown in FIG. 14, the Soot discharge amount is estimated without consideration of the correction based on the "mist average equivalence ratio φ at the timing of starting ignition" when the mist equivalence ratio correlated value at the timing of starting ignition is equal to or smaller than a predetermined value. This is based on the fact that, when the mist average equivalence ratio φ at the timing of starting ignition is small (e.g., when φ is less than 2), Soot is less likely to be produced, and the degree of influence of the magnitude of φ on the degree of generation of Soot is small. With this operation, when the Soot discharge amount is calculated, it becomes possible to avoid an increase in calculation load, which would otherwise occur when φ is taken into consideration (that is, the ratio "A3t/A3s" is added to the generation correction term), without lowering calculation accuracy, in the case where the "mist average equivalence ratio φ at the timing of starting ignition" is small.

Figure 15:
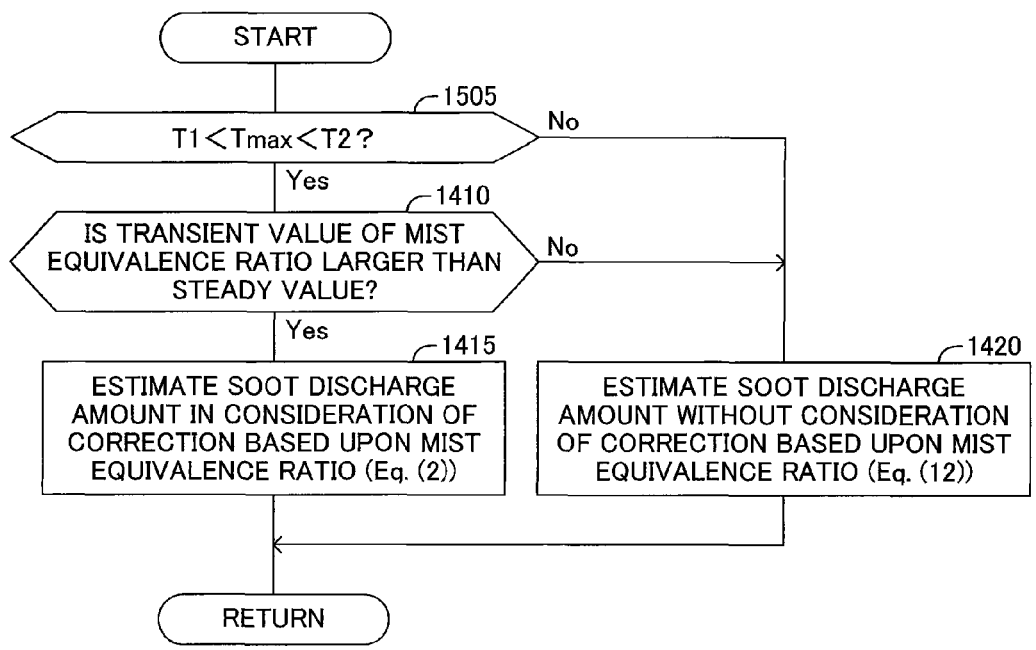
FIG. 15 is a flowchart showing another example of processing for the case where the Soot discharge amount is estimated in consideration of correction based on the mist average equivalence ratio only under a predetermined condition.

Next, an example shown in FIG. 15 will be described. This example differs from the example shown in FIG. 14 only in that the above-described step 1405 of the example of FIG. 14 is replaced with step 1505. In step 1505, a determination is made as to whether or not the above-mentioned (maximum) flame temperature Tmax falls within a predetermined range (between T1 and T2). Specifically, T1 is 1600K, and T2 is 2200K, for example. That is, when the flame temperature Tmax is outside the predetermined range (equal to or lower than T1, or equal to or higher than T2), the Soot discharge amount is estimated without consideration of correction based on the "mist equivalence ratio φ at the timing of starting ignition". This is based on the fact that, when the flame temperature Tmax is outside the Soot generation region, the Soot is less likely to be produced, and the degree of influence of the magnitude of φ on the degree of generation of Soot is small. With this operation, when the Soot discharge amount is calculated, it becomes possible to avoid an increase in calculation load, which would otherwise occur when φ is taken into consideration (that is, the ratio "A3t/A3s" is added to the generation correction term), without lowering calculation accuracy, in the case where the flame temperature Tmax is outside the predetermined range.

Various cases in which the transient correction value is calculated in consideration of the correction based upon φ only when the predetermined condition is satisfied have been described above.

The above-described equations (2) and (12) for calculating the transient correction value may be modified through omission of a portion (arbitrary one or more terms) of a plurality of terms contained in each equation (excluding the term "A3t/A3s" in the Eq. (2)).

The invention claimed is:

1. A soot discharge estimating device for an internal combustion engine comprising:
   a steady discharge amount acquisition device that acquires a steady discharge amount of soot on the basis of a previously stored relation between discharge amount of soot discharged from the internal combustion engine and at least operation speed and fuel injection amount of the internal combustion engine in the case where the internal combustion engine is in a steady operation state, and respective current values of the operation speed and the fuel injection amount;
   a steady value acquisition device that acquires a steady value of a mist equivalence ratio at a timing of starting ignition, the mist equivalence ratio being a value based upon a ratio of a fuel amount to an air quantity in a fuel mist, on the basis of a previously stored relation between a value of a predetermined parameter that represents an operation state of the internal combustion engine and the value of the mist equivalence ratio at the time of starting ignition in the case where the internal combustion engine is in the steady operation state, wherein the value of the mist equivalence ratio at the time of starting ignition is obtained on the basis of an ignition delay period that is a period between a time of starting fuel injection and the time of starting ignition, and a current value of the predetermined parameter;
   a transient value acquisition device that acquires a current value of the ignition delay period, and acquires a transient value of the mist equivalence ratio at the time of starting ignition based upon at least the acquired current value of the ignition delay period, wherein the transient value is a current value of the mist equivalence ratio at the time of starting ignition;
   a transient correction value calculation device that calculates a transient correction value regarding the discharge amount of soot from a steady characteristic value and a transient characteristic value, the steady characteristic value being obtained on the basis of the steady value of the mist equivalence ratio at the time of starting ignition and a previously stored characteristic that represents a change in the discharge amount of soot with the value of the mist equivalence ratio, and the transient characteristic value being obtained on the basis of the transient value of the mist equivalence ratio at the time of starting ignition and the characteristic; and
   a soot discharge amount estimation device that estimates the discharge amount of soot on the basis of the steady discharge amount and the transient correction value.

2. A soot discharge estimating device for an internal combustion engine according to claim 1, wherein an average value of the value based upon the ratio of the fuel amount to the air quantity in the fuel mist is employed as the mist equivalence ratio.

3. A soot discharge estimating device for an internal combustion engine according to claim 1, wherein the transition value acquisition device acquires a current value of an oxygen concentration of gas in the combustion chamber of the internal combustion engine, and acquires the transient value of the mist equivalence ratio at the time of starting ignition based on the acquired current value of the oxygen concentration.

4. A soot discharge estimating device for an internal combustion engine according to claim 3, wherein the transient value acquisition device calculates an amount of mist forming gas at the time of starting ignition, the mist forming gas being gas that is mixed with the fuel injected in the combustion chamber to form the fuel mist, and acquires the transient value of the mist equivalence ratio at the time of starting ignition based upon the calculated amount of the mist forming gas at the time of starting ignition, the acquired current value of the oxygen concentration of the gas in the combustion chamber, and the amount of the injected fuel.

5. A soot discharge estimating device for an internal combustion engine according to claim 1, wherein the transient correction value calculation device calculates the transient correction value in consideration of the mist equivalence ratio, when the transient value of the mist equivalence ratio at the time of starting ignition is larger than a predetermined value, and calculates the transient correction value without consideration of the mist equivalence ratio, when the transient value of the mist equivalence ratio at the time of starting ignition is not more than the predetermined value.

6. A soot discharge estimating device for an internal combustion engine according to claim 5, wherein the transient correction value calculation device calculates the transient correction value in consideration of the mist equivalence ratio, when the transient value of the mist equivalence ratio at the time of starting ignition is larger than the steady value thereof, and calculates the transient correction value without consideration of the mist equivalence ratio, when the transient value of the mist equivalence ratio at the time of starting ignition is not more than the steady value thereof.

7. A soot discharge estimating device for an internal combustion engine according to claim 1, wherein the transient correction value calculation device calculates the transient correction value in consideration of the mist equivalence ratio, when a flame temperature during an expansion stroke in the combustion chamber of the internal combustion engine falls within a predetermined range, and calculates the transient correction value without consideration of the mist equivalence ratio, when the flame temperature is outside the predetermined range.

* * * * *